Dec. 27, 1960

M. W. CRABB ET AL 2,965,977

JET ENGINE SIMULATION SYSTEM

Filed Sept. 21, 1956

EDWARD G. SCHWARM
MERLE W. CRABB
*INVENTORS*

BY

*Darby & Darby*

ATTORNEYS.

Dec. 27, 1960  M. W. CRABB ET AL  2,965,977
JET ENGINE SIMULATION SYSTEM
Filed Sept. 21, 1956  2 Sheets-Sheet 2
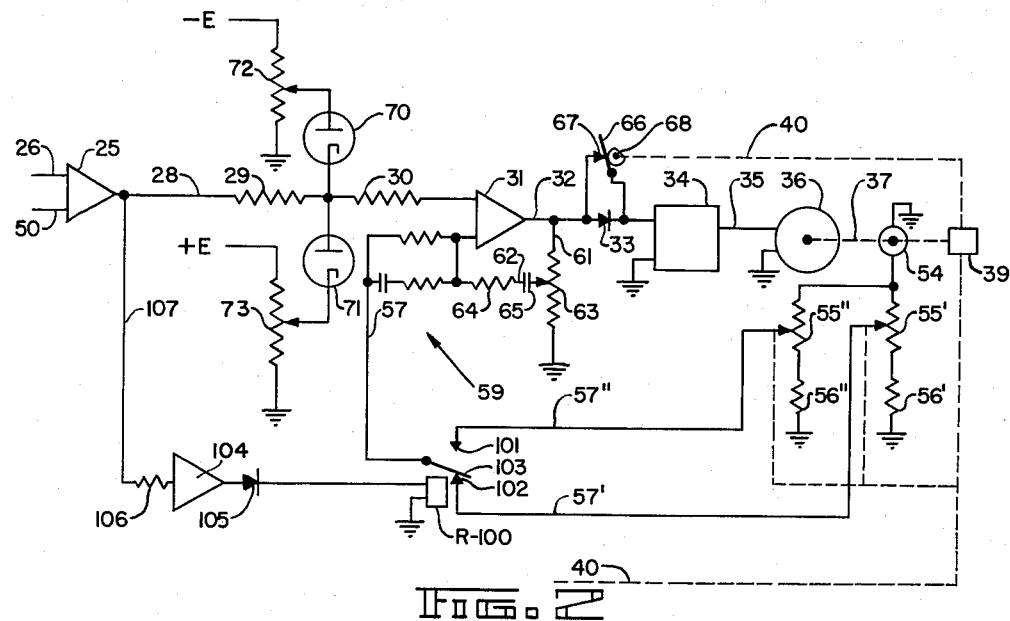
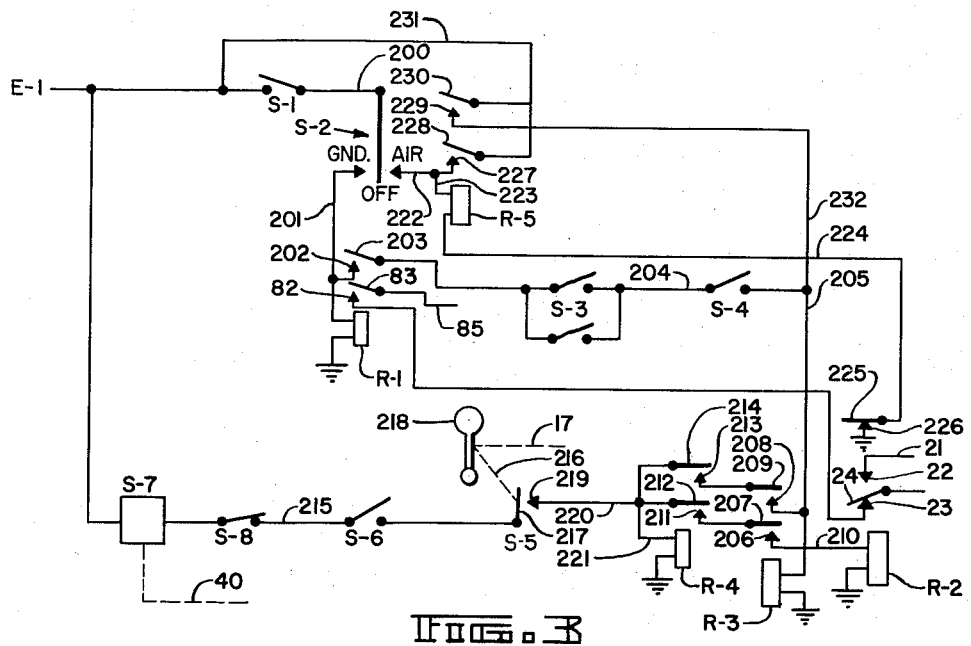
INVENTORS
MERLE W. CRABB
EDWARD G. SCHWARM
BY
Darby & Darby
ATTORNEYS.

United States Patent Office 2,965,977
Patented Dec. 27, 1960

2,965,977

JET ENGINE SIMULATION SYSTEM

Merle W. Crabb, Vestal, and Edward G. Schwarm, Binghamton, N.Y., assignors to General Precision Inc., a corporation of Delaware Filed Sept. 21, 1956, Ser. No. 611,226

12 Claims. (Cl. 35—12)

This invention relates generally to simulating devices and more particularly to apparatus for simulating the operation of a jet engine speed control system.

In the construction and operation of aircraft training or simulating devices, it is essential that the apparatus employed duplicate all the important functions and characteristics of the aircraft itself, in order that the student pilot be given realistic "flight experience" before starting actual flight instruction. Since many modern aircraft employ jet type aircraft engines, it is important therefore that the simulating device duplicate as closely as possible the actual characteristics of a jet engine. An important characteristic of a jet engine is its speed of "r.p.m." which must be suitably simulated in the training device to enable the student pilot to accurately evaluate aircraft performance.

In general, it is not only necessary to simulate the instantaneous speed of the engine during different flying conditions, but it is also necessary to accurately simulate the engine acceleration and deceleration characteristics. The over-all operation of a jet engine depends on many factors including throttle position, altitude and Mach number, all of which must be provided for in the simulating device itself. Finally, the speed characteristics of the engine must be simulated during both ground and airborne starting operations.

Accordingly, it is an object of this invention to provide apparatus for simulating the operation of a jet engine speed control system, said apparatus embodying a novel combination variable rate velocity and position servomechanism to simulate the acceleration and deceleration characteristics of the engine.

It is a further object of this invention to provide apparatus for simulating the operation of a jet engine speed control system, said apparatus embodying novel circuit means for simulating the minimum idle speed controls on the engine.

It is a still further object of this invention to provide apparatus for simulating the operation of a jet engine speed control system, said apparatus embodying novel means to simulate both ground and airborne starting operations.

Briefly, the invention comprises apparatus for simulating the operation of a jet engine speed control system in which a novel servomechanism is employed to simulate the acceleration and deceleration characteristics of the engine. The input of the servomechanism is connected to receive the output signals from control signal deriving means which includes throttle signal deriving means and the output of the servomechanism is adapted to be connected to indicating means for indicating the simulated speed of the engine. The servomechanism has a first mode of operation wherein it operates as a position servomechanism in response to position error signals and a second mode of operation wherein it operates as a variable rate velocity servomechanism responsive to velocity feedback signals which are modulated in accordance with servomechanism position. Inasmuch as the positional output of the servomechanism is representative of simulated engine speed, the rate of change of positional output, or velocity output of the servomechanism is representative of simulated engine acceleration. Accordingly, the second mode of operation of the servomechanism, wherein it is responsive to variable rate velocity feedback signals, serves to simulate the acceleration and deceleration characteristics of the engine for the simulated speed at which the engine is operating.

In one embodiment of the invention, the variable rate velocity feedback means comprises a generator driven by the servomechanism motor means and a potentiometer connected across the output of the generator. The movable top of the potentiometer is actuated by the motor means to modulate the velocity signal from the generator in accordance with the positional output of the servomechanism. This arrangement may be utilized to simulate the operation of an engine having the same acceleration and deceleration characteristics. When the engine being simulated has dissimilar acceleration and deceleration characteristics, another embodiment of the invention provides for the use of two potentiometers connected across the output of the generator. One of the potentiometers is employed for engine acceleration and the other for engine deceleration.

Means are provided in both embodiments of the invention for simulating the maximum acceleration and deceleration of the engine. Such means operate to inhibit the first mode of operation of the servomechanism for all but a predetermined range of position error signals and may take the form of voltage limiting means responsive solely to position error signals. Additionally both embodiments of the invention include means for simulating the operation of the minimum idle speed control on the engine and for simulating the speed characteristics of the engine during ground and airborne starting operations.

For a fuller understanding of the nature and objects of the invention, reference should be had to the following detailed description taken in connection with the accompanying drawings, in which:

Figure 2 is a schematic diagram of another form of the invention in which provision is made for simulating the operation of a jet engine speed control system for a jet engine which has dissimilar acceleration and deceleration characteristics; and Figure 3 is a schematic diagram of an engine starting control system suitable for use with the apparatus of Figures 1 and 2.

Figure 1:
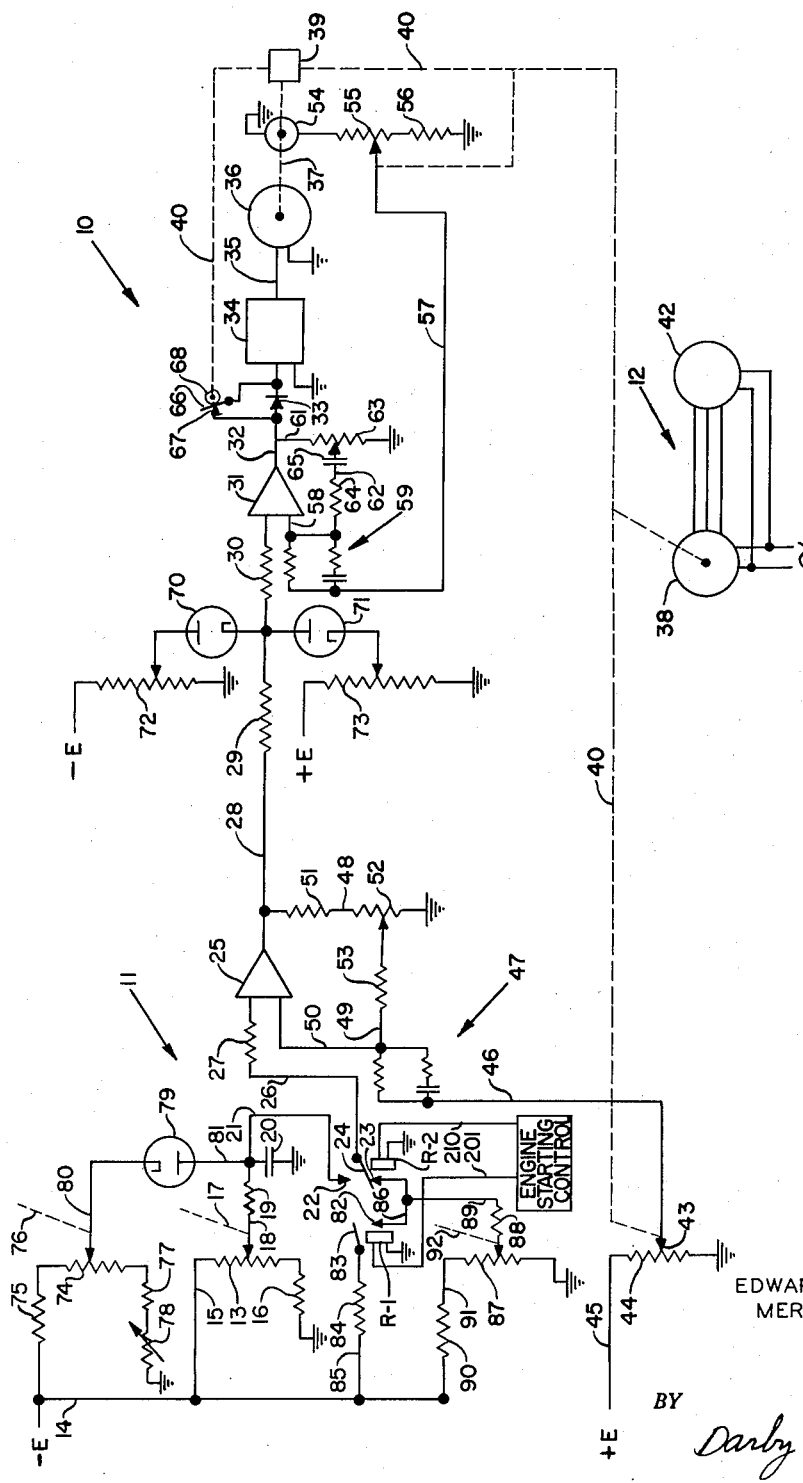
Figure 1 is a schematic diagram of apparatus constructed in accordance with the invention for simulating the operation of a jet engine speed control system.

Referring now to Figure 1 of the drawing, there is shown a servomechanism, indicated generally as 10, which has its input connected to receive signals from control signal deriving means, indicated generally as 11, and its output connected to indicating means 12. The indicating means 12 are adapted to provide a direct indication of the simulated speed of a jet engine. The input or control signals for the servomechanism 10 are derived from a plurality of signal deriving means included in the control signal deriving means 11. In order to simulate the throttle control for an engine, throttle signal deriving means are employed and comprise a potentiometer 13 arranged to be energized from a source of voltage —E through leads 14 and 15. A dropping resistor 16 is located between potentiometer 13 and ground. The movable tap on potentiometer 13 is actuated by a mechanical linkage 17 connected to a simulated throttle control indicated in Figure 3 as 218 and provides a signal proportional to the movement of the simulated throttle control at lead 18.

In the illustrated form of the invention, the potentiometer 13 is shown as being a linear potentiometer but it is to be understood that if the throttle mechanism on the actual engine being simulated is non-linear in operation, a non-linear potentiometer would be employed. The output signal from the throttle signal deriving means 13 is passed through an integrating network composed of resistor 19 and capacitor 20 to introduce an artificial time delay which simulates the time delay in the throttle linkages of the actual engine control. The output signal from the integrating network is conducted along lead 21 to a fixed contact 22 of a transfer means or relay R-2. The relay R-2 has another fixed contact 23 which is connected to a windmilling signal deriving means 87 and a starting signal deriving means 84 which will be later described. The movable contact 24 of the relay R-2 is connected to the input of a first summing means 25 by lead 26 and summing resistor 27. The first summing means 25 may be a simple circuit junction or a summing amplifier of suitable gain for the servomechanism 10. The output signal from the summing means 25 is conducted by lead 28 and resistors 29 and 30 to the input of a second summing means 31 which may also be a summing amplifier.

The output signal from the second summing means 31 is conducted by lead 32 and a unidirectional conducting device 33 to the input of an amplifier 34. The output signal from amplifier 34 is conducted by lead 35 to a motor means 36 having an output shaft 37. The summing means 25 and 31, amplifier 34 and the motor means 36 may be of any suitable design to accommodate the signals received from control signal deriving means 11 and are believed conventional in nature. Output shaft 37 of motor means 36 is connected to the transmitter 38 of a conventional synchro-couple which forms the indicating means 12, by step-down gear 39 and shaft 40. A receiver 42 of the synchro-couple thus indicates a quantity proportional to the position of motor shaft 37 and is calibrated in "r.p.m." to provide an indication of simulated engine speed. Shaft 40 is also connected to the movable tap 43 of a potentiometer 44 which forms a position feedback means. Potentiometer 44 is energized by a source of voltage +E through a lead 45. Thus, the output signal from the potentiometer 44 will be of opposite polarity to the signal derived from the throttle potentiometer 13, since the latter is energized from a source of voltage −E.

The output signal from tap 43 is conducted by lead 46, stabilizing network 47 and lead 50 to the input of the first summing amplifier 25. As thus far described, it is apparent that servomechanism 10 will operate as a position servomechanism and that the output signal from summing amplifier 25 will be a positional error signal which represents the difference between the simulated engine speed called for by throttle potentiometer 13, and the actual engine speed represented by potentiometer 44. In order to stabilize the operation of the position "loop" of the servomechanism 10, the gain of summing amplifier 25 is stabilized by a conventional feedback circuit including leads 48, 49 and 50 and resistors 51, 52 and 53. Stabilizing network 47 is of the conventional resistance-capacitance type and tends to minimize "hunting" of the system.

A generator 54 is arranged to be driven by the motor shaft 37 such that its output signal is a direct function of the instantaneous velocity of the motor 36. The output signal from generator 54 is connected to ground through potentiometer 55 and fixed resistor 56. The movable tap of potentiometer 55 is connected to the input of the second summing amplifier 31 through leads 57 and 58 and conventional stabilizing network 59 and is mechanically connected to the motor shaft 37 by shaft 40 and gear box 39. Potentiometer 55 thus forms a modulating means for varying the output velocity signal from generator 54 in accordance with the position of motor means 36. Accordingly, the modulated signal fed back to summing amplifier 31 is a variable rate velocity feedback signal. The gain of this "loop" is stabilized by a conventional feedback circuit comprising leads 61 and 62, resistors 63 and 64, and capacitor 65 connected around summing amplifier 31. From the foregoing description, it is believed apparent that servomechanism 10 may operate as a variable rate velocity servomechanism and as a position servomechanism with the positional output of the servomechanism representing the simulated speed of the engine and the velocity output representing the simulated acceleration. The variable rate velocity mode of operation of the servomechanism permits it to simulate the acceleration and deceleration characteristics of the jet engine for the particular simulated speed at which the engine is operating. Thus the potentiometer 55 forming the modulating means may have a non-linear resistance characteristic to represent the non-linearity of the acceleration and deceleration characteristics of the engine.

In order to simulate the maximum operating speed of the engine, motion limiting means are provided to limit the total rotation of motor means 36 and hence the maximum speed shown on the indicating means 12. To accomplish this function, the previously referred to unidirectional conducting device 33 in the output circuit from the summing amplifier 31 is shunted by the switch contacts 66 and 67 which are normally closed over most of the operating range of the system. A cam 68 is connected to the motor shaft 37 by gear box 39 and shaft 40 so that the switch contacts are opened and closed in response to the motor shaft position, which is representative of engine speed. The unidirectional conducting device 33 permits the servomechanism to be "backed away" from the maximum position of shaft 40, indicating the maximum engine speed. It accomplishes this by blocking signals of negative polarity from the output of summing amplifier 31. Since negative polarity signals represent acceleration of the engine, it is apparent that the simulated throttle control will be ineffective to increase engine speed but will be effective to reduce engine speed. The shape of cam 68 will therefore determine at what simulated engine speed the contacts will open to place the unidirectional conducting device 33 in the circuit.

While provision has been made by the use of the aforesaid motion limiting means in the servomechanism 10 to simulate the maximum operating speed of the engine, it is apparent that further means are required to simulate the maximum acceleration and deceleration of which the engine is capable. To this end, voltage limiting means have been provided between the first and second summing amplifiers. As shown in Figure 1, a first diode 70 has its cathode connected to the output of summing amplifier 25 and its plate connected to the movable tap of a potentiometer 72 which is energized by voltage source −E. A second diode 71 is reversely connected between the output of summing amplifier 25 and the movable tap of a potentiometer 73 which is energized by voltage source +E. In operation, the voltage limiting means depend upon the principle that a diode will only conduct when its plate is at a more positive potential than its cathode. Thus, diode 71 will conduct only when a positive polarity output signal from summing amplifier 25 exceeds the positive voltage applied to the tube cathode by voltage source +E and potentiometer 73. Similarly, diode 70 will conduct only when a negative polarity output signal from summing amplifier 25 exceeds the negative voltage applied to the plate of the tube by voltage source −E and potentiometer 72.

By means of the above described voltage limiting arrangement, the position error signals from amplifier 25 will be limited to a predetermined range of values dependent upon the settings of potentiometers 72 and 73 and the magnitudes of voltage sources +E and −E. Considering now the operation of the simulating device disclosed, it is apparent that a sudden advancement of the simulated throttle control 218 will suddenly increase the output signal from potentiometer 13 applied to servomechanism 10. This increase in signal constitutes the positional error signal at that time, before the servomechanism can operate to reduce it to zero.. Accordingly, it represents the difference between the simulated engine speed called for by the position of the throttle potentiometer 13 and the simulated speed of the engine at that time as represented by the position of potentiometer 44. Thus, it is a measure of the simulated acceleration of the engine needed to increase its speed to that called for by the throttle potentiometer. Since the voltage limiting diodes 70 and 71 limit the positional error signals to a predetermined range of values lying between the maximum positive and negative error signals, it is apparent that they will also limit the maximum velocity of the servomechanism 10 in either direction of rotation and hence the maximum simulated acceleration and deceleration of the jet engine.

In order to prevent a "flame-out" condition of the jet engine, many engine speed control systems include minimum idle controls for preventing the pilot from reducing the throttle position below a predetermined minimum idle speed of the engine. The minimum idle speed for satisfactory operation of the engine depends upon altitude primarily, and to a much lesser extent on Mach number. Accordingly, to simulate the operation of the minimum idle control on the engine, a potentiometer 74 is energized from voltage source —E through a dropping resistor 75 to provide a signal which is representative of the minimum permissible idle speed of the engine. The movable contact of the potentiometer 74 is actuated by an input shaft 76 which is varied in accordance with the simulated altitude at which the engine is operating. Since the minimum idle speed of the engine may be a non-linear function of altitude, the potentiometer 74 may be non-linear in resistance characteristic. Resistor 77 and variable resistor 78 permit the output signal from potentiometer 74 to be initially adjusted. The output signal from the minimum idle signal deriving means 74 is connected to the cathode of a diode 79 by lead 80, while the plate of the diode is connected to the output of throttle potentiometer 13 by means of lead 81. In operation, the diode 79 is a clamping circuit which prevents the signal applied to the input of amplifier 25 from the throttle potentiometer 13 from falling below a predetermined minimum. Thus, if the output signal from the throttle potentiometer 13 is less than that required for simulating permissible idle speed of the engine for the particular simulated altitude at which the engine is operating, the diode 79 will conduct and maintain the input signal to the amplifier 25 at the required level.

Referring now to Figure 2 of the drawing, there is shown an alternate embodiment of the invention wherein provision is made for the simulation of the acceleration and deceleration characteristics of an engine, where the acceleration and deceleration characteristics are dissimilar. In place of the potentiometer 55 in the embodiment of Figure 1, there is employed potentiometers 55' and 55" which simulate the acceleration and deceleration characteristics, respectively, of the engine. It will be noted that both potentiometers 55' and 55" are connected in parallel across the output of generator 54 and are connected to ground through resistors 56' and 56" respectively. The movable taps of the potentiometers are actuated by shaft 40 driven by motor means 36. The tap of potentiometer 55" is connected to the fixed contact 102 of a biased relay R-100 by a lead 57' and the tap of potentiometer 55' is connetced to the fixed contact 101 of the relay by a lead 57". A movable contact 103 of the relay R-100 is connected through lead 57 and the stabilizing network 59 to the input of the second summing amplifier 31. Accordingly, the position of movable contact 103 determines whether the signal from the acceleration potentiometer 55' or the deceleration potentiometer 55" is fed back into amplifier 31.

As previously explained, the output signal from the first summing amplifier 25 will be negative when the engine is accelerating and positive when the engine is decelerating. In order to operate relay R-100 properly in accordance with the polarity of the output signal from the amplifier 25, a polarity detector comprising amplifier 104, rectifier 105 and summing resistor 106 is connected between the relay R-100 and the output of the first summing amplifier 25 by a lead 107. If the relay R-100 is of the spring biased type, it is apparent that it will be actuated by signals of one polarity only, the polarity being determined by the direction of conduction of rectifier 105. In the arrangement illustrated in Figure 2, if a negative signal, denoting acceleration, appears at the output of amplifier 25, the rectifier 105 will not conduct and the movable contact 103 of the relay R-100 connects the output of acceleration potentiometer 55' to the input of summing amplifier 31. Should the output signal from amplifier 25 become positive, denoting deceleration of the engine, the rectifier 105 will conduct and energize relay R-100. The movable contact 103 will then connect the output from deceleration potentiometer 55" to the input of amplifier 31.

Thus far in this description, it has been assumed that the engine is in a fired condition and the operation described for that condition. The simulating apparatus disclosed also includes provision for simulating both ground and airborne starting operations of the jet engine and will provide indications at indicator 12 of the simulated speeds of the engine during these simulated starting operations. Returning now to Figure 1 of the drawing, it is seen that the input to the first summing amplifier 25 is obtained through the movable contact 24 of a relay R-2. The relay R-2 is normally deenergized and the contact 24 in the position shown, such that the input to the summing amplifier 25 is obtained through the fixed contact 23. The energization of relay R-2 is obtained from an engine starting control circuit which is illustrated in Figure 3 of the drawing.

As seen in Figure 1 of the drawing, a relay R-1 has a fixed contact 82 and a movable contact 83 which is connected to the voltage source —E by resistor 84 and leads 85 and 14. The fixed contact 82 is connected to the fixed contact 23 of relay R-2 by a lead 86, such that when relay R-1 is energized, a fixed voltage is applied to the contact 23 of relay R-2 and subsequently to the input of summing amplifier 25. The contact 23 of relay R-2 is also connected to a movable tap on a wind-milling signal potentiometer 87 by means of resistor 88 and lead 89. Potentiometer 87 is energized from voltage source —E through dropping resistor 90 and leads 14 and 91. The movable tap on the potentiometer 87 is actuated by a shaft 92 in accordance with the simulated Mach number at which the engine is operating. The purpose of this windmilling signal potentiometer will be later described.

In starting the jet engine of an aircraft, it is essential that the pilot perform certain operations, and the function of the circuit illustrated in Figure 3 is to simulate their performance by the student pilot. A switch S-1 representing the battery switch of the engine control system is connected to a supply voltage source E-1 and the movable contact of a starting switch indicated as S-2 by lead 200. The starting switch S-2 has three positions, which are a ground position for initiating starts of the engine when the aircraft is on the ground, an air position for initiating starts of the engine while the aircraft is airborne, and an off position. The ground contact of the switch S-2 is connected to the relay R-1 by lead 201, such that as switch S-2 is moved to the ground position the relay R-1 is energized. Upon energization of Relay R-1 the contacts 82, 83 shown in Figures 1 and 3 close, thereby applying a fixed voltage to the input of summing amplifier 25 through leads 14, 85, 86 and 26, the relay R-2 being deenergized as illustrated. This fixed voltage causes the servomechanism 10 to start driving the indicator 12 to a position representative of the starting speed of the engine caused by the starting motor.

Relay R-1 has an additional set of contacts 202 and 203 which are also closed when the relay is energized. The movable contact 203 is connected to one side of a double-pole, single-throw switch S-3 which represents the fuel boost pump and auxiliary fuel boost pump switches of the actual engine. The other side of switch S-3 is connected by a lead 204 to a switch S-4 which represents the ignition switch of the engine. The switch S-4 is also connected to another relay R-3 by means of lead 205. This relay is also energized upon the energization of relay R-1 if the ignition and fuel boost pump switches are closed. The relay R-3 has a first set of contacts 206 and 207 and a second set of contacts 208 and 209. Contact 206 is connected to relay R-2 by lead 210 as shown in Figures 1 and 3 of the drawing. Movable contact 207 is connected to one of the fixed contacts 211 of a relay R-4 having other contacts 212, 213, and 214. Relay R-4 is adapted to be energized by the voltage source E-1 if certain conditions are met. These conditions are represented by a throttle cutoff switch S-5, a fuel shutoff switch S-6 and a time delay switch S-7. A switch S-8 is normally closed and is for the instructor's use in simulating engine failure.

The time delay switch S-7 is arranged to apply the voltage E-1 at its output lead 215 when the simulated engine speed reaches approximately five percent of its maximum speed. A suitable arrangement would comprise for example a cam operated switch actuated by shaft 40 in response to engine speed. The switch S-6 representing the fuel shutoff switch of the engine would be closed by the pilot during normal flight conditions and the throttle cut-off switch S-5 is arranged to be actuated by a linkage 216 connected to its movable contact 217, when the simulated throttle control 218 is moved slightly beyond the cut-off position. Since the fixed contact 219 of the cut-off switch is connected to relay R-4 through leads 220 and 221, it is apparent that relay R-4 will become energized after the simulated speed of the engine increases to five percent of its maximum and the pilot moves the simulated throttle control 218 beyond the cut-off point. When relay R-4 is energized its contacts close and the voltage from source E-1 is conducted through leads 215, 220, the contacts 211, 212, the contacts 206, 207 of relay R-3 and the lead 210 to relay R-2. The relay R-2 then becomes energized and its movable contact 24 connects the input of summing amplifier 25 to the output of the throttle potentiometer 13 and normal flight conditions are now being simulated. At the same time relay R-4 is energized its additional contacts 213, 214 provide a holding circuit in conjunction with contacts 208 and 209 of relay R-3 so that relays R-3 and R-4 are both energized from the voltage source E-1. Should the starting switch S-2 be moved to the "off" position, thus deenergizing relay R-1 the relay R-2 will now remain energized indicating an "engine fired" condition.

When simulating airborne starts of the engine, it is necessary to simulate the so-called windmilling operation of the engine. This is a function of the Mach number of the aircraft in flight and causes operation of the engine through the interaction of the air stream and the parts of the engine. Accordingly, a signal must be supplied to the servomechanism 10 which represents the simulated speed of the engine at that particular Mach number. To accomplish this, the aforementioned potentiometer 87 of Figure 1, is actuated by Mach number input means 92 and produces a signal across resistor 88 which is a function of the simulated speed of the engine in flight at that particular Mach number. The potentiometer 87 may be non-linear in construction since the speed of the windmilling engine may be non-linear with respect to Mach number. As seen in Figure 1, when the engine is not fired and the craft is in flight the relay R-2 connects the output from the Mach number potentiometer 87 to the input of summing amplifier 25, which causes indicator 12 to indicate a simulated windmilling speed.

In order to start the engine in flight the pilot utilizes the windmilling of the engine and does not resort to the use of the starting motor as in ground starts. This condition is simulated in the circuit of Figure 3 when the starting switch S-2 is placed in the air position. The voltage from supply source E-1 is applied to relay R-5 through battery switch S-1, starting switch S-2 and leads 222 and 223. The other side of relay R-5 is connected to ground through lead 224 and the normally closed contacts 225 and 226 of relay R-2. Since the relay R-2 would be in a deenergized position during airborne starts of the engine, it is apparent that the relay R-5 will be energized upon movement of the starting switch S-2 to the air position. The relay R-5 has a first set of contacts 227, 228 and a second set of contacts 229, 230 which are normally open. The contacts 229 and 230 are arranged to connect the relay R-3 to the voltage source E-1 through leads 231, 232, and 205, thus bypassing the starting motor. The contacts 227, 228 provide a holding circuit for the relay R-5. The operation of the circuit is now essentially the same as in ground starts and the relay R-4 would be energized when the pilot moves the simulated throttle 218 beyond the cut-off position and the time delay switch S-7 applies the fixed voltage of E-1 at lead 215 upon the engine reaching five percent of its maximum speed. With relays R-4 and R-3 energized the relay R-2 is now energized, thus transferring operation of the servomechanism 10 to the throttle potentiometer 13 as in normal flight conditions. At the same time relay R-2 is energized, its normally closed contacts 225, 226 open, thus deenergizing the relay R-5.

Accordingly, it is apparent that the jet engine simulator disclosed in Figures 1, 2 and 3 of the drawing is operable to simulate the speeds of a jet engine during ground and airborne starting conditions and during normal flight conditions.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. A combination variable rate velocity and position servomechanism comprising control signal deriving means adapted to produce at its output an electric signal in response to variations of a control quantity; first summing means connected to receive the output signal from said control signal deriving means; second summing means connected to receive the output signal from said first summing means; electric motor means connected to receive the output signal from said second summing means for control thereby; position feedback means connected to the shaft of said motor means and adapted to produce an output signal which is a function of the position of said shaft, said position feedback means having its output signal connected to the input of said first summing means; variable rate velocity feedback means comprising a generator connected to the shaft of said motor means and modulating means connected to receive the output signal from said generator, said modulating means being operable to modulate the output signal from said generator in accordance with the position of said motor shaft, the modulated output signal from said modulating means being connected to the input of said second summing means; and voltage limiting means connected between said first and second summing means for limiting the output signal from said first summing means to a predetermined range of values.

2. A combination variable rate velocity and position servomechanism as in claim 1, wherein said voltage limiting means comprises a first unidirectional conducting device connected between the output of said first summing means and a source of voltage of one polarity and a second unidirectional conducting device reversely connected between the output of said first summing means and a source of voltage of another polarity.

3. A combination variable rate velocity and position servomechanism as in claim 1, wherein said modulating means comprises a potentiometer connected across the output of said generator, the movable tap of said potentiometer being actuated by said motor shaft and being electrically connected to the input of said second summing means.

4. A combination variable rate velocity and position servomechanism as in claim 1, wherein said modulating means comprises a pair of potentiometers connected in parallel across the output of said generator, said potentiometers having dissimilar resistance characteristics, the movable taps of said potentiometers being actuated by said motor shaft and being adapted to be electrically connected to the input of said second summing means by selectively operable switching means responsive to the polarity of the output signal from said first summing means.

5. A combination variable rate velocity and position servomechanism as in claim 4, wherein said selectively operable switching means comprises a biased relay connected for energization to the output of said first summing means through a unidirectional conducting device.

6. Apparatus for simulating the operation of a jet engine speed control system comprising control signal deriving means including throttle signal deriving means adapted to derive a signal representative of the position of a simulated throttle control for a simulated jet engine; first summing means connected to receive the output signal from said control signal deriving means; second summing means connected to receive the output signal from said first summing means; motor means connected to receive the output signal from said second summing means and adapted to be connected to indicating means for indicating the simulated speed of said engine; position feedback means responsive to the position of said motor means and having its output signal connected to the input of said first summing means; variable rate velocity feed back means responsive to the velocity and position of said motor means and having its output signal connected to the input of said second summing means, said variable rate velocity feedback means simulating the acceleration and deceleration characteristics of said engine for the simulated speed at which said engine is operating; and limiting means connected between said first and second summing means for limiting the output signal from said first summing means to a predetermined range of values thereby simulating the maximum acceleration and deceleration of said engine.

7. Apparatus for simulating the operation of a jet engine speed control system comprising control signal deriving means including throttle signal deriving means adapted to derive an electric signal representative of the position of a simulated throttle control for a simulated jet engine; first summing means connected to receive the output signal from said control signal deriving means; second summing means connected to receive the output signal from said first summing means; electric motor means connected to receive the output signal from said second summing means for control thereby and adapted to be connected to indicating means for indicating the simulated speed of said engine; position feedback means connected to the shaft of said motor means and adapted to produce an output signal which is a function of the position of said shaft, said position feedback means having its output signal connected to the input of said first summing means; variable rate velocity feedback means comprising a generator connected to the shaft of said motor means and modulating means connected to receive the output signal from said generator, said modulating means being operable to modulate the output signal from said generator in accordance with the position of said motor shaft, the modulated output signal from said modulating means being connected to the input of said second summing means to thereby simulate the acceleration and deceleration characteristics of said engine for the simulated speed at which said engine is operating; and voltage limiting means connected between said first and second summing means for limiting the output signal from said first summing means to a predetermined range of values thereby simulating the maximum acceleration and deceleration of said engine.

8. Apparatus as in claim 7, wherein said voltage limiting means comprises a first unidirectional conducting device connected between the output of said first summing means and a source of voltage of one polarity and a second unidirectional conducting device reversely connected between the output of said first summing means and a source of voltage of another polarity.

9. Apparatus as in claim 7, wherein said modulating means comprises a potentiometer connected across the output of said generator, the linearity of the resistance characteristic of said potentiometer being representative of the linearity of both the acceleration and deceleration characteristics of said engine, the movable tap of said potentiometer being actuated by said motor shaft and being electrically connected to the input of said second summing means.

10. Apparatus as in claim 7, wherein said modulating means comprises a pair of potentiometers connected in parallel across the output of said generator, the linearity of the resistance characteristic of one potentiometer being representative of the linearity of the acceleration characteristic of said engine and the linearity of the resistance characteristic of the other potentiometer being representative of the linearity of the deceleration characteristic of said engine, the movable taps of said potentiometers being actuated by said motor shaft and being adapted to be electrically connected to the input of said second summing means by selectively operable switching means responsive to the polarity of the output signal from said first summing means.

11. Apparatus as in claim 10, wherein said selectively operable switching means comprises a biased relay connected for energization to the output of said first summing means through a unidirectional conducting device.

12. Apparatus for simulating the operation of a jet engine speed control system comprising control signal deriving means including throttle signal deriving means adapted to derive an electric signal representative of the position of a simulated throttle control for a simulated jet engine; first summing means connected to receive the output signal from said control signal deriving means; second summing means connected to receive the output signal from said first summing means; electric motor means connected to receive the output signal from said second summing means for control thereby and adapted to be connected to indicating means for indicating the simulated speed of said engine; position feedback means connected to the shaft of said motor means and adapted to produce an output signal which is a function of the position of said shaft, said position feedback means having its output signal connected to the input of said first summing means, variable rate velocity feedback means comprising a generator connected to the shaft of said motor means and modulating means connected to receive the output signal from said generator, said modulating means being operable to modulate the output signal from said generator in accordance with the position of said motor shaft, the modulated output signal from said modulating means being connected to the input of said second summing means to thereby simulate the acceleration and deceleration characteristics of said engine for the simulated speed at which said engine is operating; voltage limiting means connected between said first and second summing means for limiting the output signal from said first summing means to a predetermined range of values thereby simulating the maximum acceleration and deceleration of said engine; and motion limiting means to limit the total movement of said motor means and thereby simulate the maximum speed of said engine, said motion limiting means comprising a unidirectional conducting device connected between said second summing means and said motor means and shunted by cam operated switch means, said cam operated switch means being actuated in response to movement of said motor means and being operable to normally short circuit said undirectional conducting device except when said motor means has reached its predetermined limit of total movement.

References Cited in the file of this patent

UNITED STATES PATENTS

| | | |
|---|---|---|
| 2,533,484 | Lukacs et al. | Dec. 12, 1950 |
| 2,584,261 | Davis et al. | Feb. 5, 1952 |
| 2,593,950 | Williams | Apr. 22, 1952 |
| 2,617,982 | Holschuh et al. | Nov. 11, 1952 |
| 2,798,308 | Stern et al. | July 9, 1957 |

FOREIGN PATENTS

| | | |
|---|---|---|
| 542,410 | Canada | June 18, 1957 |

OTHER REFERENCES

Electronic Analog Computers (Text), Korn and Korn, 2nd ed., 1956, McGraw-Hill Book Co.

Electron Tube Circuits (Seely), 1950, pages 125 and 126.

Servo Mechanism Practice (Ahrendt), 1952, page 120.